(12) United States Patent
Joseph, II et al.

(10) Patent No.: US 8,656,738 B2
(45) Date of Patent: Feb. 25, 2014

(54) GLASS SHEET SEPARATING DEVICE

(75) Inventors: Michael Albert Joseph, II, Corning, NY (US); Steven Edward DeMartino, Elmira, NY (US)

(73) Assignee: Corning Incorporated, Corning, NY (US)

( * ) Notice: Subject to any disclaimer, the term of this patent is extended or adjusted under 35 U.S.C. 154(b) by 745 days.

(21) Appl. No.: 12/262,800

(22) Filed: Oct. 31, 2008

(65) Prior Publication Data

US 2010/0107848 A1 May 6, 2010

(51) Int. Cl.
  *C03B 33/00* (2006.01)
  *C03B 33/10* (2006.01)
  *C03B 33/12* (2006.01)

(52) U.S. Cl.
  USPC .................................. 65/97; 65/90

(58) Field of Classification Search
  USPC .......... 65/97, 174, 176; 83/862, 436.3, 436.6; 225/93, 97, 103–106
  See application file for complete search history.

(56) References Cited

U.S. PATENT DOCUMENTS

| | | | |
|---|---|---|---|
| 2,607,169 A | 8/1952 | Randels | |
| 3,338,696 A | 8/1967 | Dockerty | |
| 3,682,609 A | 8/1972 | Dockerty | |
| 3,716,176 A * | 2/1973 | Yamada et al. | 225/96.5 |
| 3,800,991 A * | 4/1974 | Grove et al. | 225/2 |
| 3,889,862 A * | 6/1975 | Insolio et al. | 225/96.5 |
| 4,005,808 A * | 2/1977 | Insolio | 225/2 |
| 4,018,372 A * | 4/1977 | Insolio | 225/2 |
| 4,076,159 A * | 2/1978 | Farragher | 225/3 |
| 4,140,820 A * | 2/1979 | DeTorre | 427/292 |
| 4,175,684 A * | 11/1979 | Butler | 225/2 |
| 4,256,246 A * | 3/1981 | Kindel | 225/103 |
| 4,489,870 A * | 12/1984 | Prange et al. | 225/2 |
| 4,545,515 A * | 10/1985 | Kozyrski | 225/96.5 |
| 4,749,400 A * | 6/1988 | Mouly et al. | 65/97 |
| 4,948,025 A * | 8/1990 | Lisec | 225/104 |
| 5,303,861 A * | 4/1994 | Allaire et al. | 225/2 |
| 5,458,269 A * | 10/1995 | Loomis | 225/2 |
| 5,584,016 A | 12/1996 | Varghese et al. | 364/468 |
| 5,622,540 A * | 4/1997 | Stevens | 65/112 |
| 5,873,922 A * | 2/1999 | Lisec | 65/112 |
| 6,434,974 B1* | 8/2002 | Lisec | 65/174 |
| 7,128,250 B2 | 10/2006 | Luiz | 225/2 |
| 7,234,620 B2* | 6/2007 | Andrewlavage, Jr. | 225/1 |
| 2002/0084301 A1* | 7/2002 | Murgatroyd | 225/105 |
| 2005/0056127 A1 | 3/2005 | Yamabuchi et al. | 83/13 |
| 2006/0191970 A1 | 8/2006 | Kataoka et al. | 225/2 |
| 2006/0201986 A1* | 9/2006 | Sasaki et al. | 225/105 |
| 2006/0236840 A1* | 10/2006 | McGlinchy et al. | 83/879 |
| 2006/0261118 A1* | 11/2006 | Cox et al. | 225/96 |

(Continued)

FOREIGN PATENT DOCUMENTS

| | | | | |
|---|---|---|---|---|
| DE | 3428863 A1 * | 2/1986 | | C03B 33/02 |
| DE | 3927731 A1 * | 2/1991 | | C03B 33/02 |
| EP | 503647 A2 * | 9/1992 | | C03B 33/07 |

(Continued)

*Primary Examiner* — Jodi C Franklin
(74) *Attorney, Agent, or Firm* — Jeffrey A. Schmidt (57) ABSTRACT

A scoreless separation device and method are described herein for separating a glass sheet without needing to score the glass sheet. In one embodiment, the device shears a stationary glass sheet without needing to score the glass sheet. In another embodiment, the device shears a moving glass sheet to remove outer edges from the moving glass sheet without needing to score the moving glass sheet.

17 Claims, 11 Drawing Sheets

(56) References Cited

U.S. PATENT DOCUMENTS

| | | | |
|---|---|---|---|
| 2007/0039990 A1* | 2/2007 | Kemmerer et al. | 225/2 |
| 2009/0107182 A1* | 4/2009 | Anderson et al. | 65/90 |
| 2009/0250497 A1* | 10/2009 | Cox et al. | 225/2 |
| 2010/0219223 A1* | 9/2010 | Haraguchi et al. | 225/104 |
| 2011/0017713 A1* | 1/2011 | Abramov et al. | 219/121.67 |

FOREIGN PATENT DOCUMENTS

| | | |
|---|---|---|
| JP | 61-191532 | 8/1986 |
| JP | 05-132328 | 8/1993 |

* cited by examiner

GLASS SHEET SEPARATING DEVICE

TECHNICAL FIELD

The present invention relates to a device and a method for separating a glass sheet without needing to score the glass sheet. In one embodiment, the device separates a stationary glass sheet without needing to score the glass sheet. In another embodiment, the device separates a moving glass sheet to remove outer edges therefrom without needing to score the moving glass sheet.

BACKGROUND

Scoring devices such as diamond scribes, carbide scoring wheels and laser scoring devices are commonly used today in the glass industry to score a glass sheet so that the glass sheet can be broken into a desired shape. The diamond scribes have been used for over 100 years in the glass industry. The carbide scoring wheels have been used in the glass industry for about 100 years while the laser scoring devices have been used for about 30 years. Unfortunately, these scoring devices damage the top surface of the glass sheet which severely limits the edge strength of the separated glass sheet. Accordingly, there is a need for a device and method that can address this shortcoming and other shortcomings which are associated with the scoring and separation of a glass sheet. This need and other needs are satisfied by the present invention.

SUMMARY

In one aspect, the present invention provides a device for separating a stationary glass sheet where the device includes: (a) a support plate; (b) a first stabilizing surface extending upward from the support plate; (c) an anvil surface extending upward from the support plate, where the glass sheet is located on top of the support plate, the first stabilizing surface, and the anvil surface; (d) a second stabilizing surface placed on top of the glass sheet, where the second stabilizing surface is located on an opposite side of the glass sheet when compared to the first stabilizing surface and the anvil surface, where the second stabilizing surface is located closer to the anvil surface than to the first stabilizing surface; and (e) a stress surface placed on the top of the glass sheet, where the stress surface is located between the first stabilizing surface and the anvil surface both of which are located on the opposite side of the glass sheet from the stress surface, where the stress surface when moved towards the glass sheet contacts the glass sheet closely adjacent to the anvil surface to generate a stress profile within the glass sheet that produces a crack in the glass sheet and separates the glass sheet into two separate glass sheets. This is important because the resulting quality of the separated edge on the glass sheet is pristine and superior in finish and strength to the current scored edge.

In another aspect, the present invention provides a separation device for separating a moving glass sheet without having to score the moving glass sheet. In an embodiment, the separation device includes a separating mechanism (e.g., rolls, tracks etc.) that generates a stress profile within the moving glass sheet where the stress profile produces a crack in a predefined location within the moving glass sheet to shear off at least one edge of the moving glass sheet. This is important because the resulting quality of the separated edge on the glass sheet is pristine and superior in finish and strength to the current scored edge.

In yet another aspect of the present invention there is provided a glass manufacturing system (and corresponding method) that includes the following: (a) least one vessel for melting batch materials and forming molten glass; (b) a forming device for receiving the molten glass and forming a moving glass sheet; (c) a pull roll assembly for drawing the moving glass sheet; (d) a scoreless separation apparatus for separating the moving glass sheet, where the scoreless separating apparatus includes one or more separation devices each of which includes: (i) a separation mechanism (e.g., rolls, tracks etc.) that generates a stress profile within the moving glass sheet where the stress profile produces a crack which is subsequently formed in a predefined location within the moving glass sheet to shear off an edge of the moving glass sheet; (ii) at least two pairs of stabilizing rolls that control a crack propagation wavefront after the crack is formed within the moving glass sheet and also direct the sheared-off edge away from a remaining portion of the moving glass sheet; (iii) at least one pair of re-directing rolls that further direct the sheared-off edge away from the remaining portion of the moving glass sheet; (d) at least one sheet stabilizing device for stabilizing the remaining portion of the moving glass sheet; and (e) a take-up roller on which there is wound the remaining portion of the moving glass sheet.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
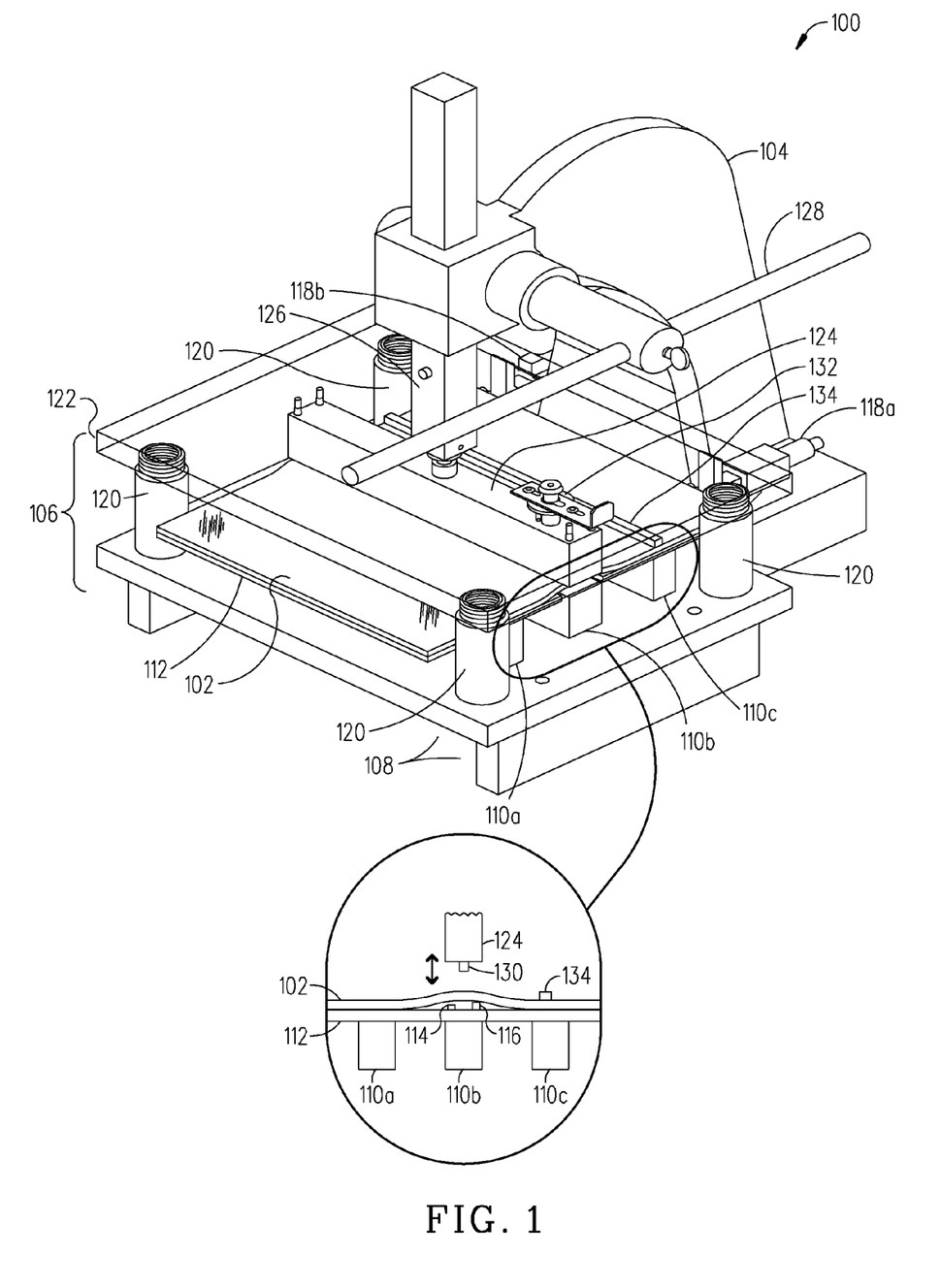
FIG. 1 is a perspective view of an exemplary device that can be used to shear a stationary glass sheet in accordance with an embodiment of the present invention.

Referring to FIG. 1, there is shown a perspective view of an exemplary device 100 that can be used to separate a stationary glass sheet 102 in accordance with an embodiment of the present invention. The exemplary device 100 includes an arbor press 104 which interfaces with a die set 106 that is used to support and shear the glass sheet 102. The die set 106 includes a bottom support platform 108 on top of which are placed multiple support bars 110a, 110b and 110c (three shown). In addition, the die set 106 includes a glass support 112 that is placed on top of the support bars 110a, 110b and 110c. The glass support 112 has extending upward therefrom a stabilizing surface 114 and an anvil surface 116 where the stabilizing surface 114 does not extend as far up as the anvil surface 116 (see the expanded view). Alternatively, the stabilizing surface 114 and the anvil surface 116 may be attached to the support bar 110b and then extend upward through the glass support 112. The glass sheet 102 can be positioned at a desired separating position on top of the glass support 112 by using one or more micrometers 118a and 118b (for example) or other suitable locating and alignment device such as an electronically controlled linear actuator which can be programmed to position the glass sheet 102 to the desired position.

The bottom support platform 108 has four alignment shafts 120 extending upward therefrom on top of which is placed a top plate 122. The top plate 122 has a stress riser 124 movably fixed thereto where the stress riser 124 can be moved in a downward direction to interface with and shear the glass sheet 102. In this example, the stress riser 124 is attached to a moveable arm 126 on the arbor press 104 and a hand controller 128 is used to move the moveable arm 126 and the attached stress riser 124 towards or away from the glass sheet 102. The stress riser 124 has extending downward therefrom a stress surface 130 which interfaces with and shears the glass sheet 102 (see the expanded view). The stress surface 130 is arranged and moves parallel to the anvil surface 116 and parallel to the glass sheet 102. Alternatively, the stress surface 130 may be arranged and move downward at a slight angle to the anvil surface 116 and the glass sheet 102, such that the stress surface initially contacts the glass sheet at one edge of the sheet only, such that the separation in the glass sheet starts at the one edge and propagates across the glass sheet. If desired, the stress riser 124 can have a score initiator 132 attached thereto which can be used to score a side edge (or top edge) of the glass sheet 102. In addition, the die set 106 includes a stabilizing surface 134 (stabilizing bar 134) which is placed on top of the glass sheet 102 at a location between the stress riser 124 and the micrometers 118a and 118b. Alternatively, the stabilizing bar 134 does not need to extend across the entire length of the glass sheet 102 but instead can be placed on one or more of the edges of the glass sheet 102. A detailed discussion about how the device 100 can be used to shear the glass sheet 102 is provided next with respect to FIGS. 2 and 3.

Figure 2A:
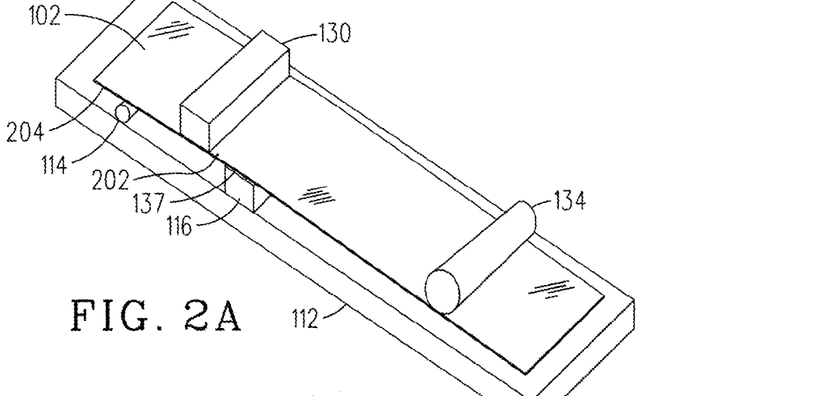
FIGS. 2A-2C and 3A-3C diagrammatically illustrate different views of how the device shown in FIG. 1 can be used to shear the stationary glass sheet in accordance with an embodiment of the present invention.
Figure 2B:
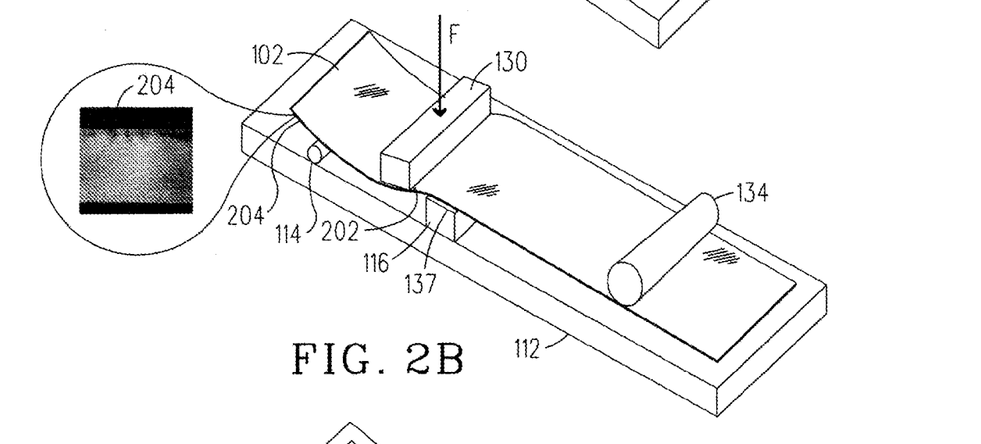
Figure 2C:
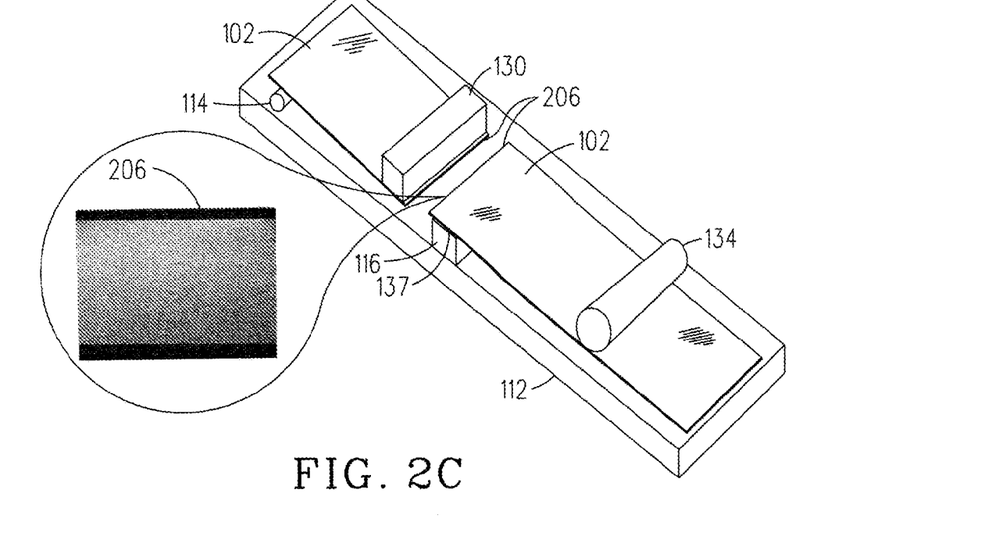
Figure 3A:
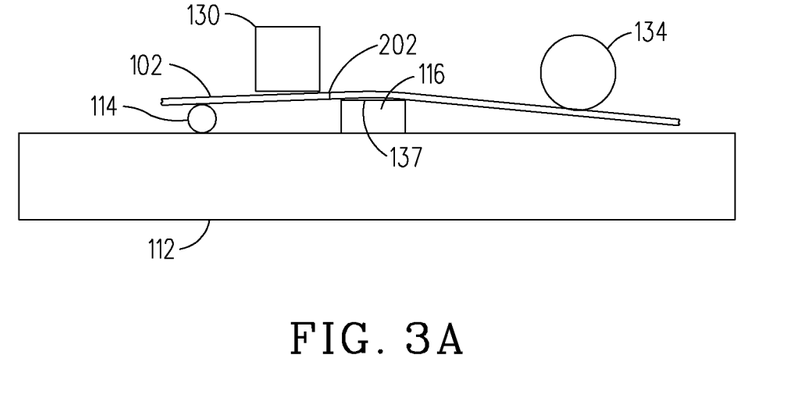

Referring to FIGS. 2A-2C and 3A-3C, there are illustrated different diagrammatic views of how the device 100 shown in FIG. 1 can be used to shear the glass sheet 102 in accordance with an embodiment of the present invention. For clarity, only the glass support 112, the stabilizing surface 114, the anvil surface 116, the stress surface 130, the stabilizing surface 134 and the glass sheet 102 are shown in these drawings to help explain the separation operation of the device 100. FIGS. 2A and 3A illustrate a first step during which the glass sheet 102 is placed in a desired position on top of the glass support 112. The glass sheet 102 is placed on top of the stabilizing surface 114, the anvil surface 116, and the glass support 112 while the stress surface 130 and the stabilizing surface 134 are placed on top of the glass sheet 102. In one embodiment, the stabilizing surface 114, the anvil surface 116, the stress surface 130 and the stabilizing surface 134 could all have a rubber coating or plastic coating to help prevent damaging the glass sheet 102. In addition, the stabilizing surface 114, the anvil surface 116, the stress surface 130 and the stabilizing surface 134 are shown as being different shapes so they could be any shape including, for example, a spherical shape, an elliptical shape, a rectangular shape or a square shape. In this embodiment, the anvil surface 116 and the stress surface 130 are generally square shaped especially at their respective facing adjacent edges 136 and 137 which are located closely adjacent to each other in order to create a highly localized stress in the glass sheet 102. The horizontal spacing between the facing adjacent edges 136 and 137 of the anvil surface 116 and the stress surface 130 may increase with increasing thickness of the glass sheet being separated. Plus, the edges of surfaces 116 and 130 are relatively sharp to provide a well defined stress field in the plane of separation on the glass sheet 102. It is possible that other shapes, as mentioned previously, may work as well. In this example, the glass sheet 102 had a starter score 202 located on the side edge thereof which was made by the score initiator 132. If desired, the starter score 202 could have been made by a laser (not shown). The starter score 202 is optional and not required to shear the glass sheet 102. In the case of the glass sheet 102 being coated with a polymer or rubber, cutting bars can be used to help remove the coating prior to separating the glass sheet 102.

Figure 3B:
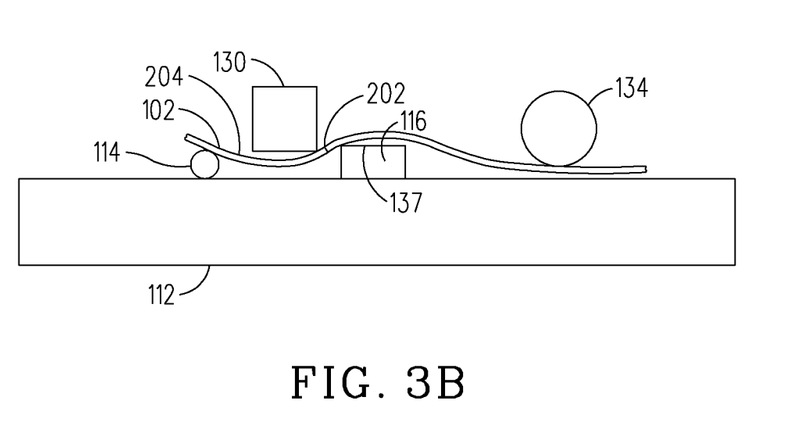

FIGS. 2B and 3B illustrate a second step during which the glass sheet 102 has a stress field generated therein by applying a force F which is caused by moving the stress riser 124 and in particular the stress surface 130 down onto the top of the glass sheet 102. The stress field is generated and rises until the starter score 202 opens and a crack travels the entire length of the glass sheet 102. The starter score 202 helps ensure that the separation is initiated at a desired location on the glass sheet 102. FIG. 2B also illustrates a photo of a side edge 204 of the glass sheet 102 that was scored in a conventional manner.

Figure 3C:
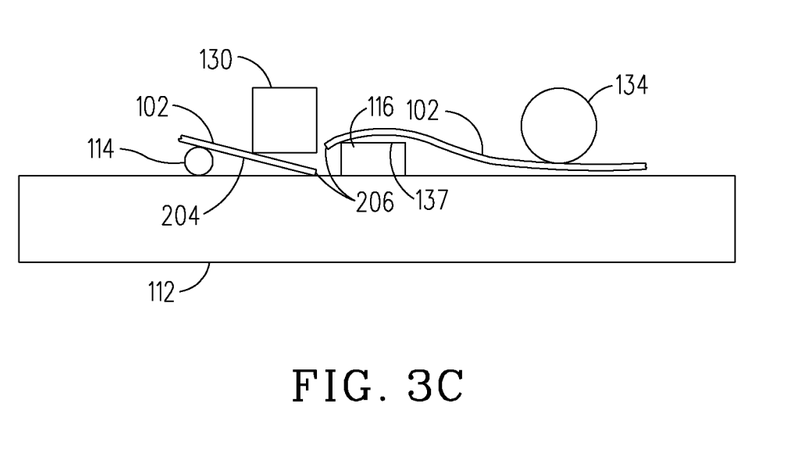

FIGS. 2C and 3C illustrate a third step showing the desired cut 206 in the glass sheet 102 and that the separation was initiated in the desired location and propagated along a desired path corresponding with the nearly symmetrical stress field located within the glass sheet 102. The stress field was created by the downward movement of the stress surface 130 onto the glass sheet 102. FIG. 2C also illustrates a photo of the edge 206 of the glass sheet 102 that was formed by the downward movement of the stress surface 130 on top of the glass sheet 102 (compare to FIG. 2B).

Figure 4A:
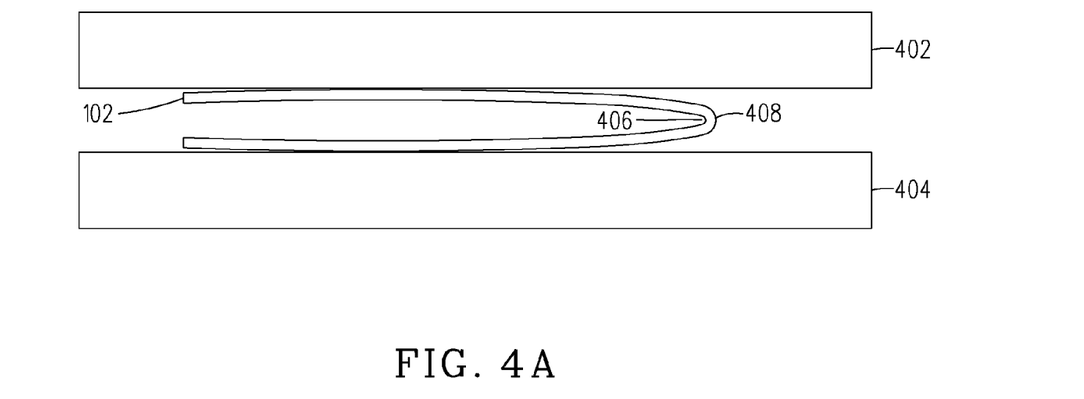
FIGS. 4A and 4B are two diagrams that respectively illustrate the results of a two point bend test which was performed on a scoreless separated glass sheet and a conventionally scored glass sheet.
Figure 4B:
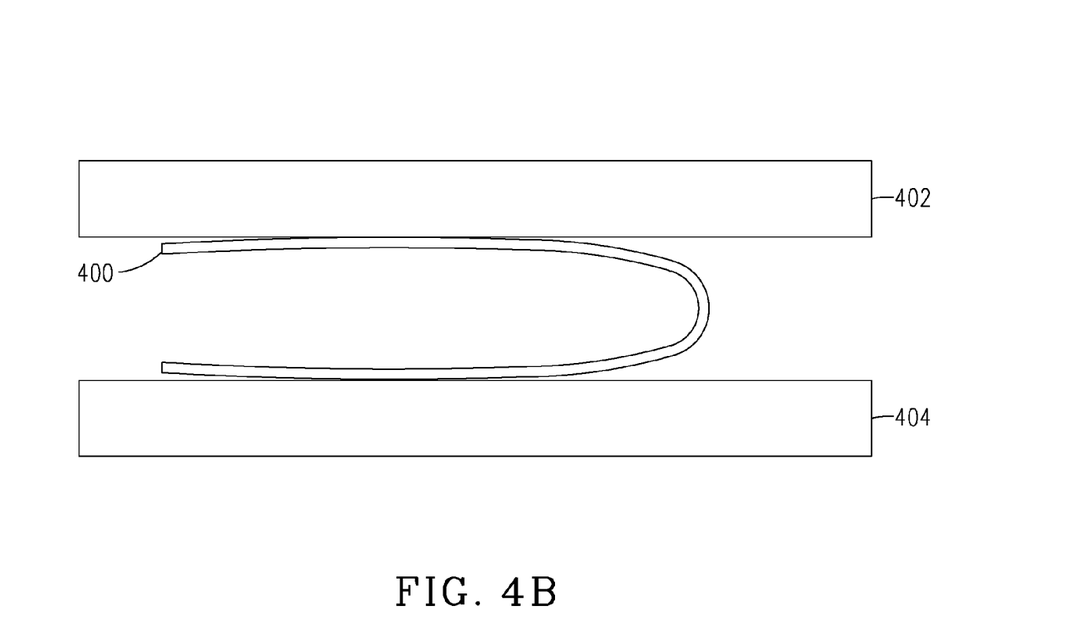

Referring to FIGS. 4A and 4B, there are two diagrams respectively illustrating the results of a two point bend test that was performed on a scoreless separated glass sheet 102 FIG. 4A) and a conventionally scored glass sheet 400 (FIG. 4B). The two point bend test was used to evaluate the bending stress on a small area of the glass sheets 102 and 400 which are the same except for the way that they were separated. In this test, two plates 402 and 404 are used to compress each of the glass sheets 102 and 400. Then, the distance between the two plates 402 and 404 is measured when the glass sheets 102 and 400 break. This distance is inversely proportional to the stress handling capability of the glass sheets 102 and 400 where the smaller the distance between the two plates 402 and 404 then the higher the resisting glass edge strength of the glass sheets 102 and 400. In FIG. 4A, the scoreless glass sheet 102 had a relatively small radius when it was broken by the compression of the two plates 402 and 404 which was indicative of a glass edge strength of greater than 600 MPa. In FIG. 4B, the conventionally scored glass sheet 400 had a relatively large radius when it was broken by the compression of the two plates 402 and 404 which was indicative of a glass edge strength of about 200 MPa.

Figure 5:
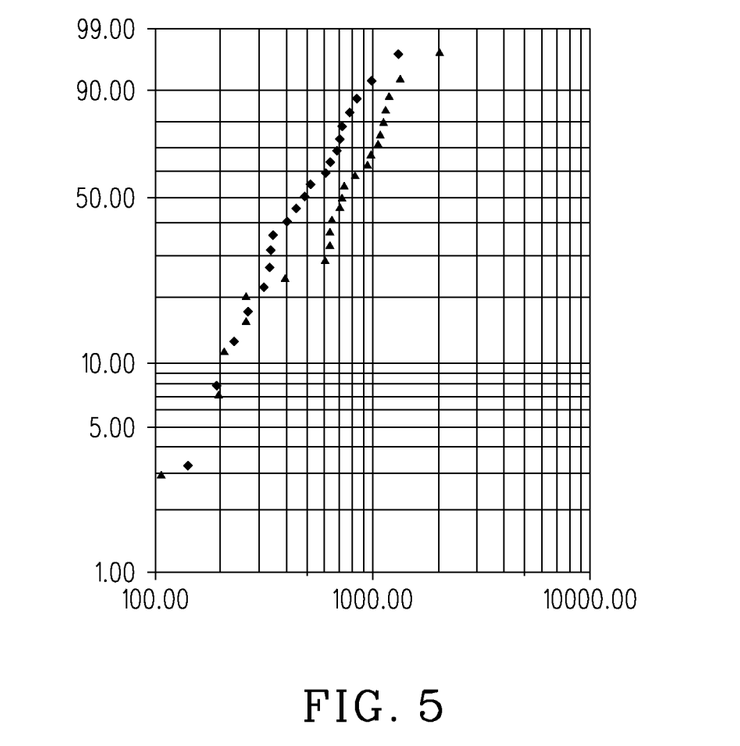
FIGS. 5-6 are graphs which indicate the stress results of several scoreless separated glass sheets which had underwent the two point bend test in accordance with an embodiment of the present invention.

Referring to FIG. 5, there is illustrated a graph which indicates that several tested glass sheets 102 which underwent the aforementioned compression test had a stress handling capacity that averaged 600-1000 MPa which is at least three times better on average than the conventional carbide wheel scored glass sheets 400 (200 MPa) and the conventional laser scored glass sheets 400 (300 MPa) (note: the y-axis of the graph represents "probability" and the x-axis represents "Stress MPa"). In this test, the glass sheets 102 where 100 µm thick and the "diamond" in the graph indicates a compression measurement and the "triangle" in the graph indicates a tension measurement. The compression measurement indicates when an inner portion 406 of the tested glass sheet 102 had broke due to the compression of the blocks 402 and 404 (see FIG. 4A). The tension measurement indicated when an outer portion 408 of the tested glass sheet 102 had broke due to the compression of the blocks 402 and 404 (see FIG. 4A).

Figure 6:
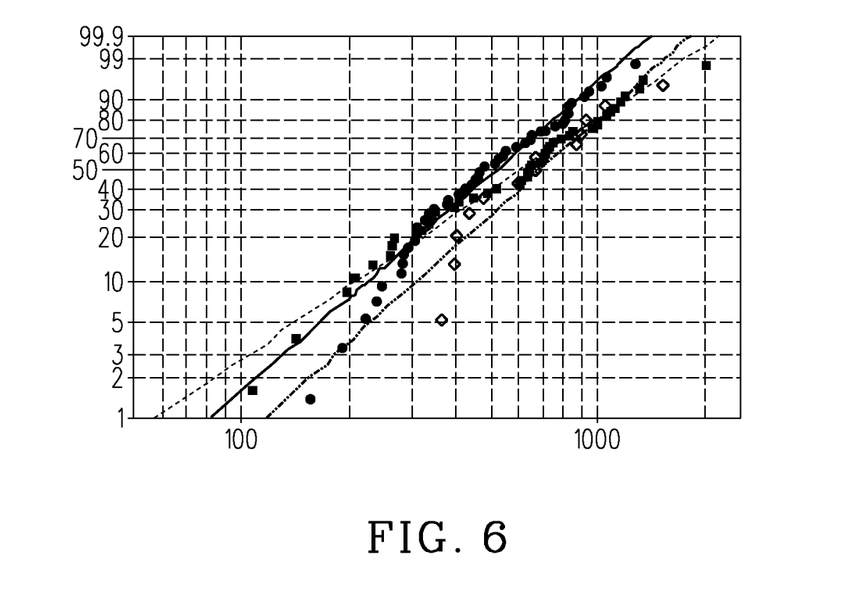

Referring to FIG. 6, there is illustrated a graph which indicates the stress results of several tested glass sheets 102 which had underwent the aforementioned compression test (note: the y-axis of the graph represents "percent" and the x-axis represents "2-Point Bend Strength (MPa)"). In this test, one set of tested glass sheets 102 which had a laser scored edge 202 indicated by the "circles" and the solid line in the graph had a stress handling capacity on average of 609.8 MPa. Another set of tested glass sheets 102 which did not have a scored edge 202 indicated by the "squares" and the dashed line in the graph had a stress handling capacity on average of 749.1 MPa. Yet another set of the tested glass sheets 102 which had a mechanical scored edge 202 indicated by the "diamonds" and the dotted-dashed line in the graph had a stress handling capacity on average of 807.0 MPa. The glass sheets 102 where all about 100 µm thick. A conclusion that can be made by viewing these results is that the scoreless method yields edge strength and quality results which are far superior to the traditional laser, screwheel, or scribe methods. The lack of a stress riser cut into the glass surface minimizes the potential for micro-cracks and flaws associated with traditional contact and non contact methods of glass scoring/separation.

Referring back to FIG. 1, a person skilled in the art will appreciate that the device 100 is an off-line glass sheet separation system that could be used by a glass manufacturer to refine their processes that require off-production line separation of glass sheets 102 (e.g., Liquid Crystal Display (LCD) substrates 102 or other substrates 102). In one embodiment, the device 100 has metal bars 114, 116, 130 and 134 covered with rubber or plastic that bend the thin glass sheet 102 such that a stress distribution is formed within the thin glass sheet 102. When the stress reaches a high enough level, it will initiate a crack at the high stress region in the thin glass sheet 102. The resulting crack propagates through the width of the thin glass sheet 102 until the stress is relieved. Since, the thin glass sheet 102 is an amorphous material with a very random atomic structure, it typically resists cutting along a plane and instead tends to shatter or cracks form and move in seemingly random directions. This does not happen in the present invention because the device 100 has the stress surface 114 which ensures that there is always a stress continuously applied to the surface of the thin glass sheet 102 which maintains the stress field or stress distribution and causes a crack propagation to proceed in a desired direction along a predefined path on the thin glass sheet 102 until the separation is complete.

The device 100 also has several other benefits, advantages and features several of which are as follows (for example):

The device 100 can easily be adjusted such that different configurations can be achieved by simply adding on, removing, or adjusting various components to separate a thin glass sheet 102.

The greater bend strength in the separated glass sheets 102 is desirable when the glass sheets 102 are used to make thin flexible displays.

The device 100 reduces production costs by increasing the yield of acceptable glass sheets 102 due to having fewer glass edge related failures.

The device 100 enhances key substrate edge attributes in the separated glass sheets 102 (see FIGS. 4-6).

The device 100 can be easily modified such that a greater understanding about a proposed scoreless separation technique can be achieved.

The device 100 reduces the risk associated with failures of glass sheets 102 that are under high stress due to the substantially stronger scoreless edges 206.

The device 100 can separate glass sheets 102 or other thin substrates which have a thickness of <100 µm.

The device 100 can incorporate different types of sensors including motion sensors, laser sensors, sonic sensors etc. to determine the performance of the separation equipment and the quality of the separated glass sheets 102.

The device 100 or versions thereof could easily be automated for commercial production of glass sheets one example of which is discussed below with respect to FIGS. 7-9. In another example, a slot draw process provides a glass sheet at a given rate. The glass sheet orientation is changed from vertical to horizontal by means of a catinary. The glass sheet now traveling in the horizontal plane is supported by rollers and is periodically nicked with a starter score and hand broken by the operator. The operator's job can be automated by a machine like device 100 with the addition of a proximity sensor to indicate when the desired glass length has been reached. This length would correspond to the position of the starter score which is desirable for proper crack initiation. The separator bars would be actuated at the desired time by a linear actuator and closed loop control with the proximity sensor. In conjunction with this action, a short throw, <100 mm, a traveling anvil machine (TAM) mechanism could be employed to keep the bars in the same relative position as the nicked glass commensurate with the time required to initiate the separation. The bars would then return to the same home position to await for the next separation event.

Figure 7:
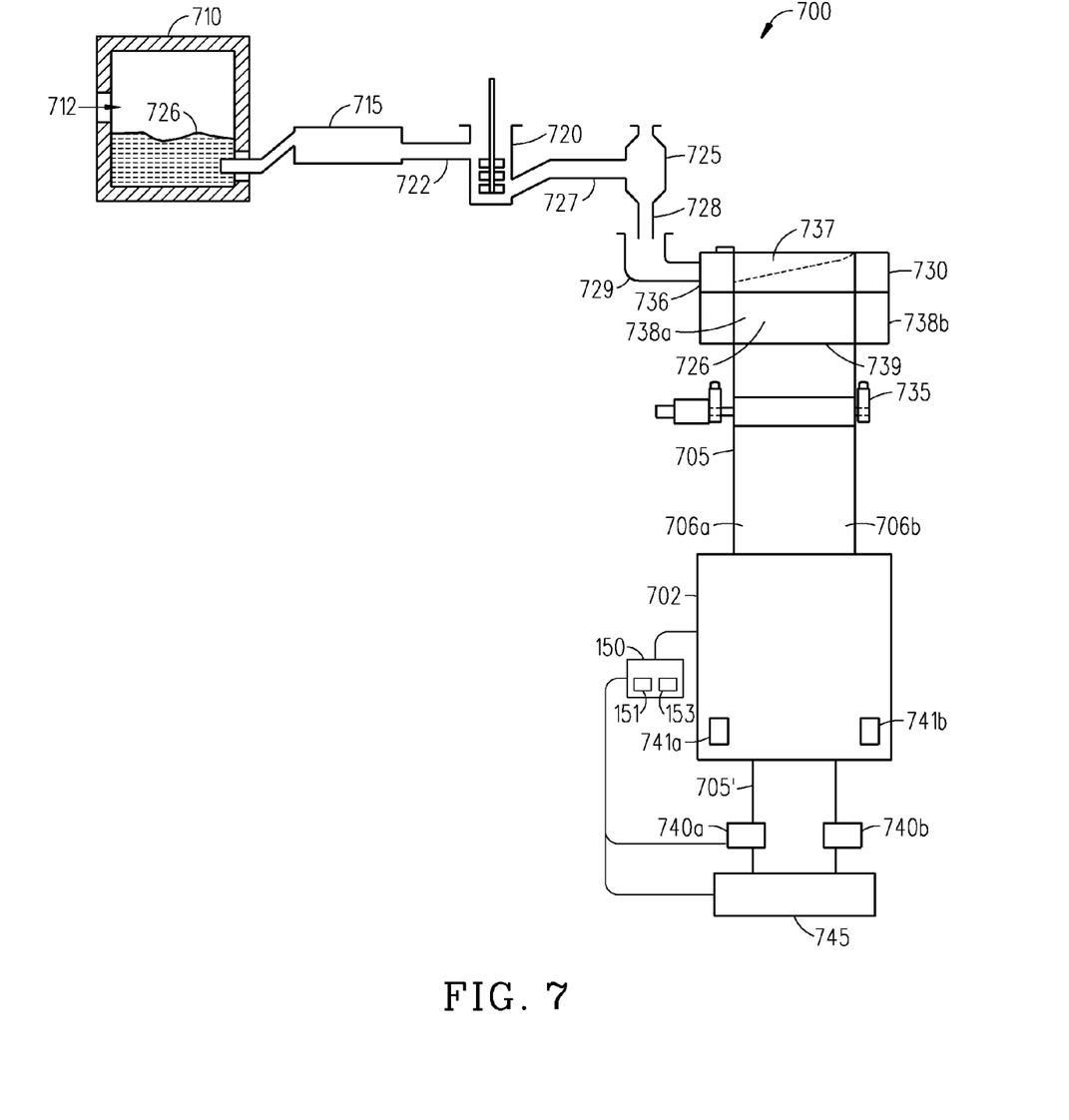
FIG. 7 is a schematic view of an exemplary glass manufacturing system which utilizes a scoreless separating apparatus to shear a moving glass sheet and remove outer edges therefrom in accordance with an embodiment of the present invention.

Referring to FIG. 7, there is shown a schematic view of an exemplary glass manufacturing system 700 which utilizes a scoreless separation apparatus 702 to shear a moving glass sheet 705 and remove outer edges 706a and 706b therefrom in accordance with an embodiment of the present invention. As shown, the exemplary glass manufacturing system 700 includes a melting vessel 710, a fining vessel 715, a mixing vessel 720 (e.g., stir chamber 720), a delivery vessel 725 (e.g., bowl 725), a forming vessel 730, a pull roll assembly 735, the scoreless separation apparatus 702, a pair of sheet stabilizer devices 740a and 740b, a take-up roller 745, and a controller 150.

The melting vessel 710 is where the glass batch materials are introduced as shown by arrow 712 and melted to form molten glass 726. The fining vessel 715 (e.g., finer tube 715) has a high temperature processing area that receives the molten glass 726 (not shown at this point) from the melting vessel 710 and in which bubbles are removed from the molten glass 726. The fining vessel 715 is connected to the mixing vessel 720 (e.g., stir chamber 720) by a finer to stir chamber connecting tube 722. And, the mixing vessel 720 is connected to the delivery vessel 725 by a stir chamber to bowl connecting tube 727.

The delivery vessel 725 delivers the molten glass 726 through a downcomer 728 and an inlet 729 into the forming vessel 730 (e.g., isopipe 730). The forming vessel 730 includes an opening 736 that receives the molten glass 726 which flows into a trough 737 and then overflows and runs down two sides 738a and 738b before fusing together at what is known as a root 739 (see also FIG. 8). The root 739 is where the two sides 738a and 738b come together and where the two overflow walls of molten glass 726 rejoin (e.g., refuse) to form the glass sheet 705 before being drawn downward by the pull roll assembly 735. The scoreless separation apparatus 702 shears the glass sheet 705 to remove the outer edges 706a and 706b therefrom and form the glass sheet 705'. The sheared outer edges 706a and 706b are broken and collected within a pair of cullet bins 741a and 741b. The sheet stabilizer devices 740a and 740b direct the remaining portion of the glass sheet 705' to the take-up roller 745. In this example, the controller 150 (e.g., computer 150) has a memory 151 that stores processor-executable instructions and has a processor 153 that executes the processor-executable instructions to control the pull roll assembly 740, the scoreless separation apparatus 702, the sheet stabilizer devices 740a and 740b and the take-up roller 745.

Figure 8:
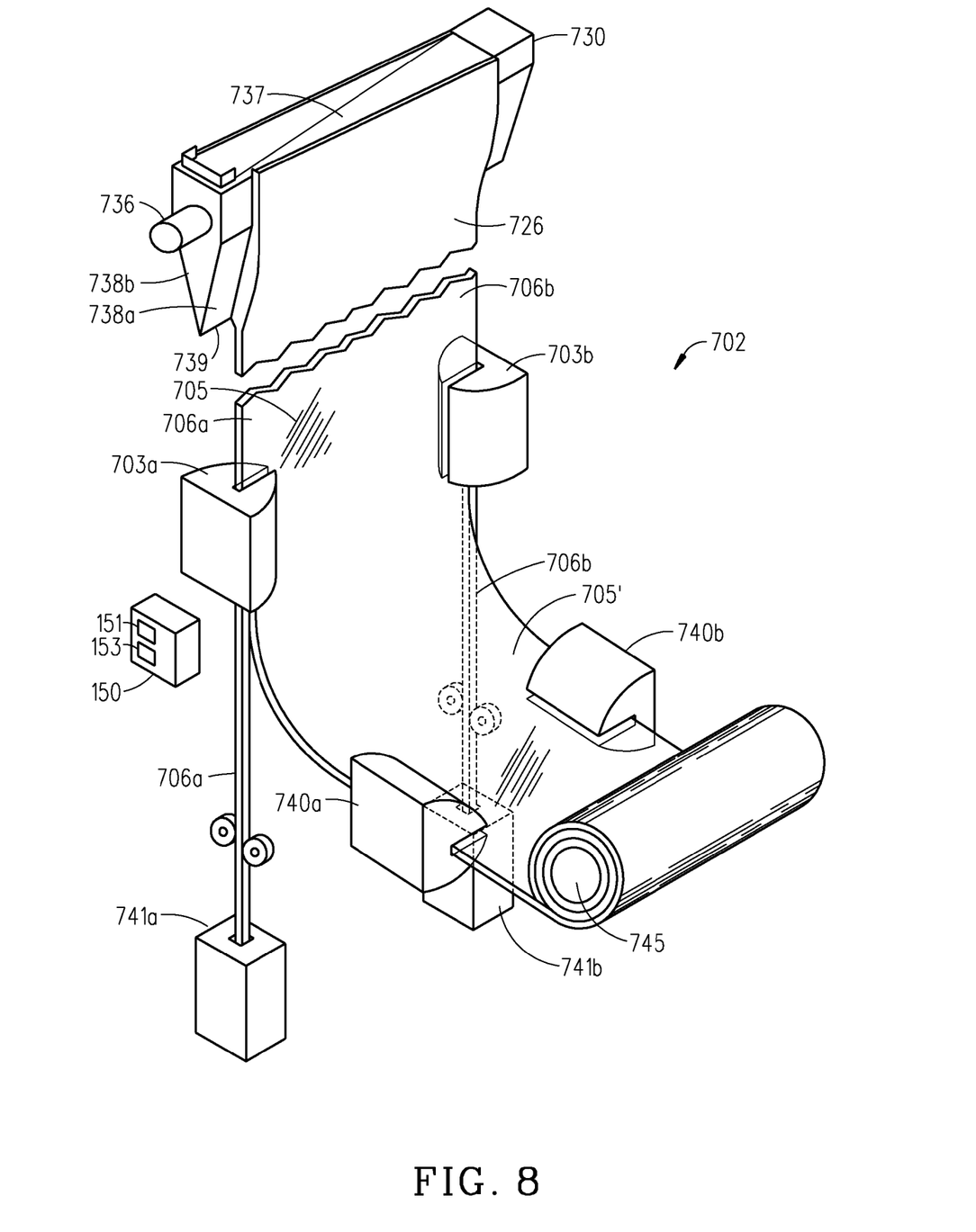
FIG. 8 is a perspective view illustrating in greater detail the components of the scoreless separating apparatus shown in FIG. 7 in accordance with an embodiment of the present invention.

Referring to FIG. 8, there is shown a perspective view illustrating in greater detail several the scoreless separation apparatus 702 and several other components of the exemplary glass manufacturing system 700 shown in FIG. 7 in accordance with an embodiment of the present invention. The scoreless separation apparatus 702 includes two separation devices 703a and 703b, the controller 150, and the cullet bins 741a and 741b. In operation, the separation devices 703a and 703b each apply an external stress to generate a stress profile within the moving glass sheet 705 where the stress profile produces a crack which is formed in a predefined location within the moving glass sheet 705 to separate and remove the outer edges 706a and 706b without needing to score the glass sheet 705. Plus, the separation devices 703a and 703b begin to curve the remaining portion of the glass sheet 705' and, with the aid of the sheet stabilizers 740a and 740b, the remaining glass sheet 705' can be rolled up on the take-up roller 745. The remaining glass sheet 705' which in this example is less than 100 μm thick has a two-point stress edge strength greater than 600 MPa which is a dramatic improvement over a conventionally scored glass sheet which had a stress edge strength in the range of 300 MPa (see FIGS. 4-6). A detailed discussion about the different components which are part of each exemplary dynamic separating device 703a and 703b is provided below with respect to FIGS. 9A-9F.

Figure 9A:
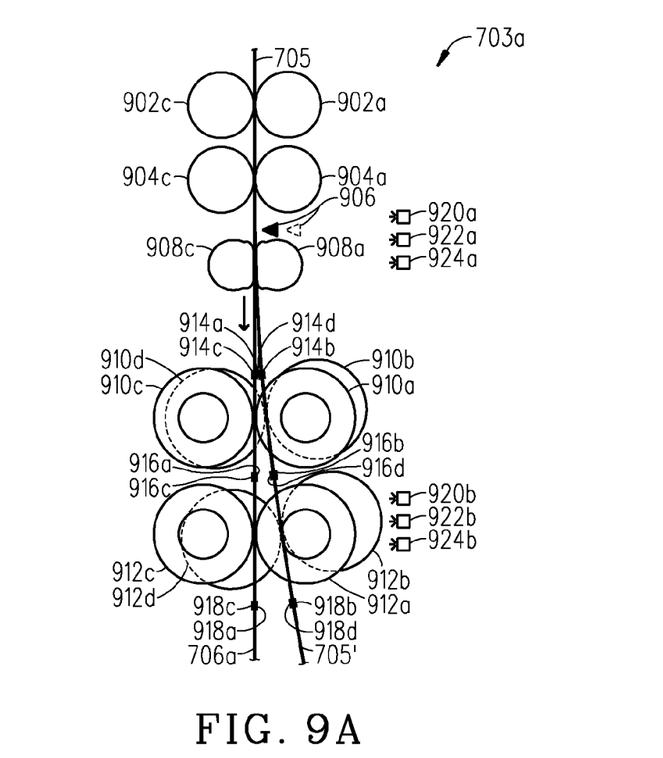
FIGS. 9A-9F are multiple diagrams illustrating the various components associated with an exemplary dynamic separation device which is part of the scoreless separating apparatus shown in FIG. 8 in accordance with an embodiment of the present invention.

Referring to FIGS. 9A-9F, there are multiple diagrams illustrating the various components associated with the exemplary dynamic separating device 703a (for example) in accordance with an embodiment of the present invention. FIG. 9A is a diagrammatic left side view of the separating device 703a which illustrates the glass sheet 705 travelling through a series of rolls including a first pair of rolls 902a and 902c, a second pair of rolls 904a and 904c, a movable crack initiator 906, a third pair of rolls 908a and 908c, a fourth pair of rolls 910a and 910c, and a fifth pair of rolls 912a and 912c. The exemplary separating device 703a also has the glass sheet 705 travel through a first pair of air bearings 914a and 914c (located between rolls 908a and 908c and rolls 910a and 910c), a second pair of air bearings 916a and 916c (located between rolls 910a and 910c and rolls 912a and 912c), and a third pair of air bearing 918a and 918c (located after rolls 912a and 912c).

In addition, the exemplary separation device 703a has several other sets of rollers 902b and 902d, 904b and 904d, 908b and 908d, and 910b and 910d which can not be seen in this particular view but are respectively located adjacent to first pair of rolls 902a and 902c, the second pair of rolls 904a and 904c, the third pair of rolls 908a and 908c, the fourth pair of rolls 910a and 910c, and the fifth pair of rolls 912a and 912c (see FIGS. 9B-9F). Likewise, the exemplary separation device 703a also includes several other sets of air bearings 914b and 914d, 916b and 916d, and 918b and 918d which can not be seen in this particular view but are respectively located adjacent to the first pair of air bearings 914a and 914c, the second pair of air bearings 916a and 916c, and the third pair of air bearing 918a and 918c (see FIGS. 9C-9D).

In FIG. 9A, the controller 150 can interface with various components like, for example, the drives, motors, solenoid valves, air devices etc. which operate the rolls 902a-902d, 904a-904d, 908a-908d, 910a-910d and 912a-912d, and the air bearings 914a-914d, 916a-916d and 918a-918d (see also FIG. 8). The controller 150 can also interface with a variety of instruments such as a pair of crack propagation scanners 920a and 920b, a pair of sheet shape interferometers 922a and 922b, and a pair of thermal scanners 924a and 924b to aid in the separation of the outer edge 706a from the moving glass sheet 705. The crack propagation scanners 920a and 920b would be used to spot and track the crack at different locations in the moving glass sheet 705. The sheet shape interferometers 922a and 922b would be used to monitor the stress profile at different locations in the moving glass sheet 705. The thermal scanners 924a and 924b would be used to monitor the thermal gradients at different locations in the moving glass sheet 705. The function of these rolls 902a-902d, 904a-904d, 908a-908d, 910a-910d and 912a-912d and the air bearings 914a-914d, 916a-916d and 918a-918d will be apparent after the discussion is completed about the layout of these rolls 902a-902d, 904a-904d, 908a-908d, 910a-910d and 912a-912d, and the air bearings 914a-914d, 916a-916d and 918a-918d.

Figure 9B:
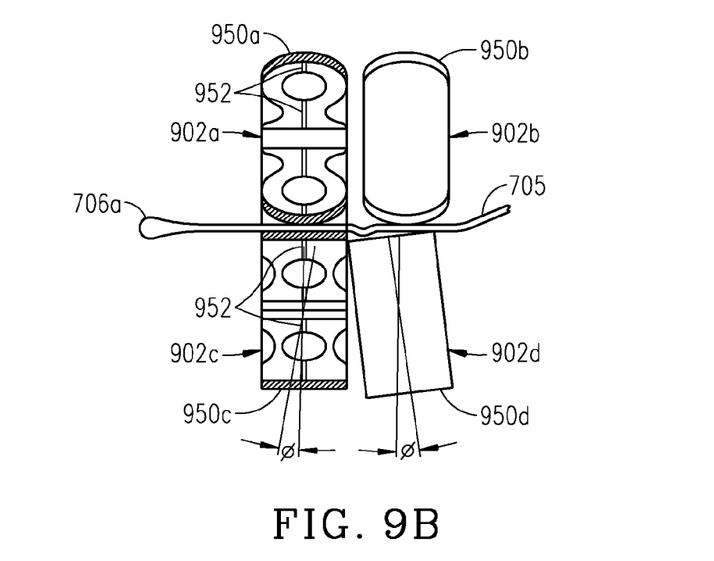

Referring to FIG. 9B, there is a top view of the exemplary dynamic separating device 703a which shows the first pair of rolls 902a and 902c and their adjacent rolls 902b and 902d through which travels the moving glass sheet 705. As shown, rolls 902a and 902b each have a curved surface 950a and 950b (e.g., high temperature silicon 950a and 950b) and their opposing rolls 902c and 902d each have a flat surface 950c and 950d (e.g., high temperature silicon 950c and 950d). The rolls 902c and 902d are also tiltable with respect to their corresponding opposing rolls 902a and 902b. For instance, rolls 902c and 902d can be tilted at an angle φ of anywhere between 0°-5°. In this example, roll 902c is not tilted with respect to roll 902a but roll 902d is tilted about 2.5° with respect to toll 902b. Thus, rolls 902a and 902c help stabilize the outer edge 706a of the moving glass sheet 705 while the curved roll 902b and tilted roll 902d interface with the moving glass sheet 705 to generate a stress profile within the moving glass sheet 705 (note: the bending of the glass sheet 705 shown in the diagram has been enhanced). If desired, the rolls 902a-902d can incorporate temperature control mechanisms such as channels 952 (for example) within which a fluid can flow to control the temperature of the respective surfaces 950a-950d. In this example, rolls 904a-904d which can not be seen in this figure would be set-up and function like rolls 902a-902d to help generate the desired stress profile in the moving glass sheet 705. Alternatively, one or more pair of tracks (or some other mechanism) could be used instead of rolls 902a-902d and 904-904d through which would pass the moving glass sheet 705 where one of the tracks would have a protrusion extending therefrom which interfaces with the moving glass sheet 705 to generate the desired stress profile within the glass sheet 705 where the stress profile produces a crack which is formed in a predefined location within the moving glass sheet 705 to shear off the outer edge 706a of the moving glass sheet 705.

Figure 9C:
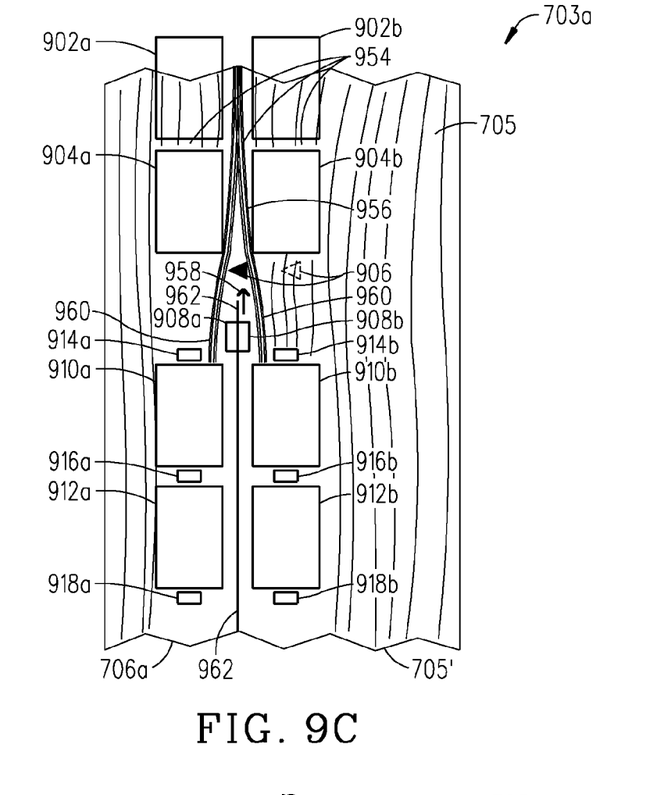

Referring to FIG. 9C, there is a front view of the exemplary dynamic separation device 703a which shows rolls 902a, 902b, 904a, 904b, 908a, 908b, 910a, 910b, 912a and 912b, the crack initiator 906, and air bearings 914a, 914b, 916a, 916b, 918a and 918b. This figure also shows the high stress regions 954, a bow wave 956, a scoreless wave front 958, low stress regions 960, and the separation line 962 (or crack 962) present in the moving glass sheet 705 when the dynamic separation device 703a is operating to shear off the outer edge 706a of the moving glass sheet 705. The separation line 962 (or crack 962) can be created by the positioning of rolls 902b and 902d and the crack initiator 906 (if used) can be moved to interface at a predefined location of the moving glass sheet 705 to help initiate the crack 962 which when formed is propagated along a desired path within the moving glass sheet 705.

Figure 9D:
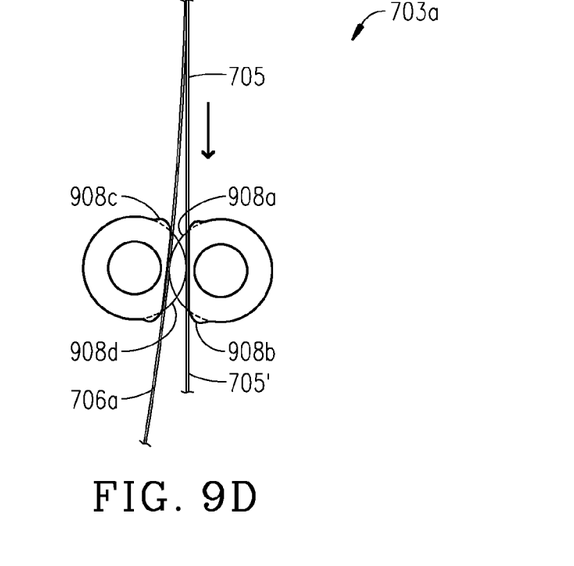
Figure 9E:
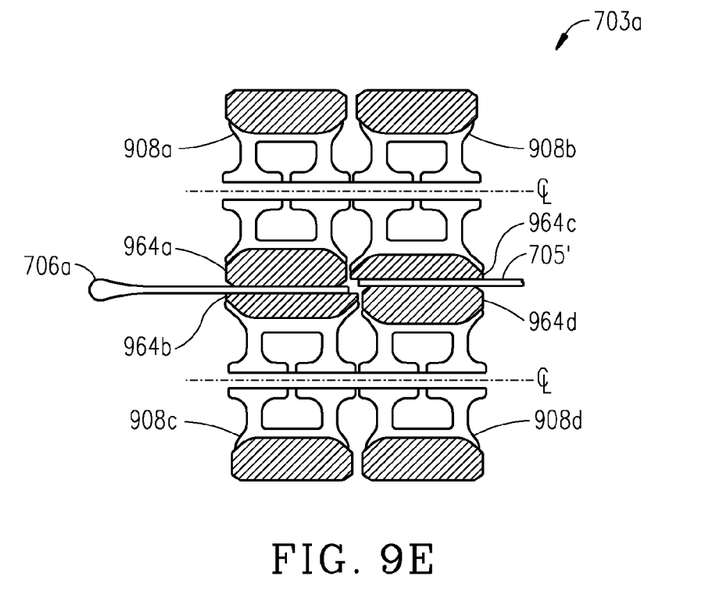

Referring to FIGS. 9D and 9E, there are respectively shown a left side view and a top view of the rolls 908a-908d through which travel the sheared-off outer edge 706a and the remaining portion of the glass sheet 705'. In particular, the stabilizing rolls 908a-908d help control the scoreless wave front 958 (crack propagation wavefront 958) after the crack 962 is formed within the moving glass sheet 705 and also direct the sheared-off outer edge 706a away from the remaining portion of the glass sheet 705'. As shown in FIG. 9E, the first pair of stabilizing rolls 908a and 908c includes roll 908a which has a hard cover 964a (high durometer) and roll 908c has a soft cover 964b (low durometer) between which passes the sheared-off outer edge 706a. The second pair of stabilizing rolls 908b and 908d includes roll 908b which has a soft cover 964c (low durometer) and roll 908d has a hard cover 964d (high durometer) between which passes the remaining portion of the moving glass sheet 705'. The soft covers 964b and 964c on rolls 908b and 908c are pliable and deform when they interface with the corresponding hard covers 964a and 964d on rolls 908a and 908d which results in re-directing the sheared-off outer edge 706a away from the remaining portion of the glass sheet 705'. The glass sheet 705' has relatively strong edges (e.g., 600 MPa or greater) which enables the glass sheet 705' to be rolled into a relatively small diameter on the take-up roll 745.

Figure 9F:
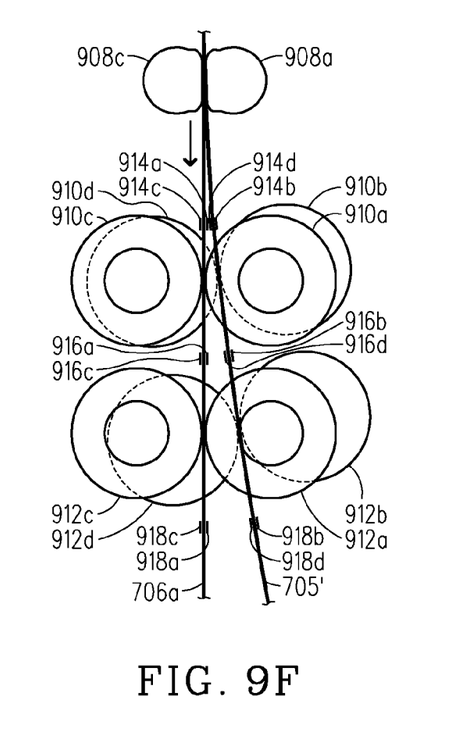

Referring to FIG. 9F, there is a left side view of rolls 908a-908d, 910a-910d and 912a-912d and air bearings 914a-914d, 916a-916d and 918a-918d through which pass the sheared-off outer edge 706a and the remaining portion of the glass sheet 705'. As discussed above, the stabilizing rolls 908a-908d direct the sheared-off edge 706a away from the remaining portion of the glass sheet 705'. The other rolls 910a-910d and 912a-912d and the air bearings 914a-914d, 916a-916d and 918a-918d further help direct the sheared-off edge 706a away from the remaining portion of the glass sheet 705'. In particular, rolls 910a, 910c, 912a and 912c and air bearings 914a, 914c, 916a, 916c, 918a and 918c are positioned to direct the sheared-off outer edge 706a towards the cullet bin 741a (see FIG. 8). In contrast, rolls 910b, 910d, 912b and 912d and air bearings 914b, 914d, 916b, 916b, 918b and 918b are positioned to direct the remaining portion of the glass sheet 705' to the sheet stabilizer devices 740a and 740b and the take-up roller 745 (see FIG. 8).

Figure 10:
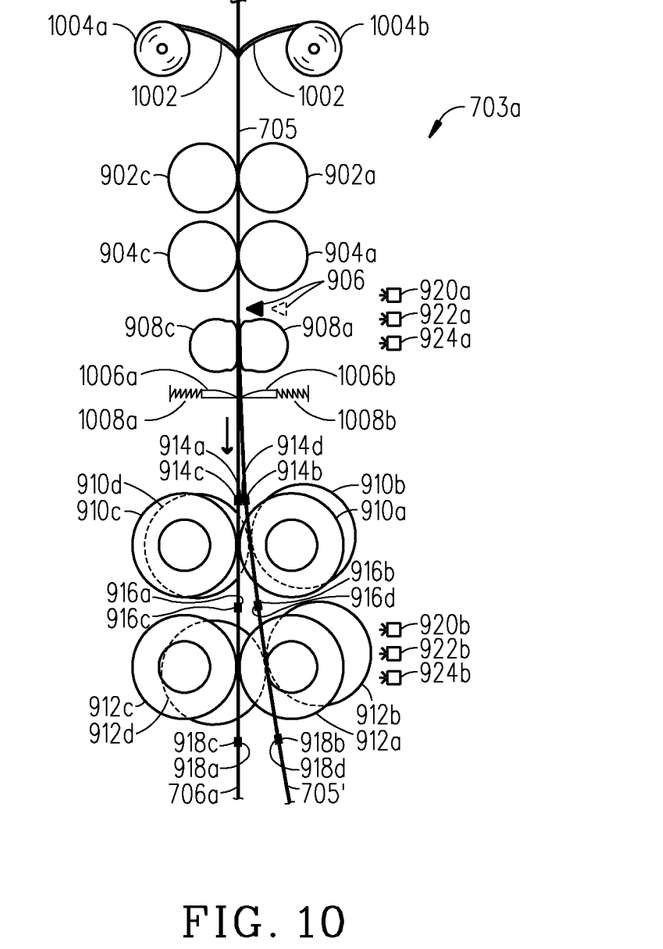
FIG. 10 is a diagram illustrating how the scoreless separating apparatus can be configured to separate the edges from a coated glass sheet in accordance with an alternative embodiment of the present invention.

Referring now to FIG. 10 there is a left side view illustrating how the scoreless separating apparatus 703a can be further configured to separate the edge 706a from a moving coated glass sheet 705 in accordance with an alternative embodiment of the present invention. In this embodiment, a polymer coating 1002 is applied to one or both sides of the glass sheet 705 by rollers 1004a and 1004b. Alternatively, the glass sheet 705 can be coated by means of rolled sheet, pre-cut sheets, or a spray or dip coating. The coating 1002 may be formed of a polymer, plastic, or rubber-like. The separation of the coating 1002 or partial cutting of the coating 1002 is required in order to be able to physically separate the glass sheet 705. For instance, the coating 1002 can be partially cut or separated from the glass sheet 702 by cutting blades 1006a and 1006b or other means such as mechanical contact cutters, stationary or rolling knives, or non-contact laser cutting, micro-flame, pneumatic jet, hot gas jet (e.g., argon gas) chemical jet, water jet. As shown, the partial cut of the coating 1002 can be achieved by attaching the mechanical cutters 1006a and 1006b to force feedback controls (e.g., springs 1008a and 1008b) that prevent excessive cutting force. This partial cut weakens the coating 1002 sufficiently so that the coating 1002 is easily broken when the glass bead portion 706a is separated from the body of the glass sheet 102 by means of the previously described rollers 910a-910d and rollers 912a-912d. The partial cut is desirable since it prevents mechanical cutters 1006a and 1006b from contacting the glass sheet 705 which may be harmful to the surface of the glass sheet 705.

In view of the foregoing discussion, it should be appreciated that an exemplary glass manufacturing system 700 which implements glass separation method in accordance with au embodiment of the present invention would include following: (a) least one vessel 710, 715, 720 and 725 for melting batch materials and forming molten glass (step 1); (b) a forming device 730 for receiving the molten glass and forming a moving glass sheet 705 (step 2); (c) a pull roll assembly 735 for drawing the moving glass sheet 705 (step 3); (d) a scoreless separation apparatus 702 for separating the moving glass sheet 705 (step 4), where the scoreless separating apparatus 702 includes one or more separation devices 703a and 703b each of which includes: (i) a separation mechanism (e.g., rolls 902a-902d and 904a-904d, tracks etc.) that generates a stress profile within the moving glass sheet 705 where the stress profile produces a crack 962 which is subsequently formed in a predefined location within the moving glass sheet 705 to shear off an edge 706a and 706b of the moving glass sheet 705; (ii) a crack initiator 906 (optional) that interfaces at the predefined location of the moving glass sheet 705 to initiate the crack 962 which is formed and then propagated within the moving glass sheet 705; (iii) at least two pairs of stabilizing rolls 908a-908d that control a crack propagation wavefront 958 after the crack 962 is formed within the moving glass sheet 705 and also direct the sheared-off edge 706a or 706b away from a remaining portion of the moving glass sheet 705'; (iv) at least one pair of re-directing rolls 910a-910d and 912a-912d that further direct the sheared-off edge 706a and 706b away from the remaining portion of the moving glass sheet 705'; (v) at least one pair of air bearings 914a-914d, 916a-916d and 918a-918d that further direct the sheared-off edge 706a and 706b away from the remaining portion of the moving glass sheet 705'; (e) one or more sheet stabilization devices 740a and 740b to stabilize the remaining portion of the moving glass sheet 705' (step 5); and (f) a take-up roller 745 on which there is wound the remaining portion of the moving glass sheet 705' (step 6).

In addition, the scoreless separation apparatus 702 may also includes a controller 150 that interfaces with one or more crack propagation scanners 920a and 920b, sheet shape interferometers 922a and 922b, and thermal scanners 924a and 924b, and then controls the separation devices 703a and 703b to shear off the outer edges 706a and 706b of the moving glass sheet 705. An advantage of this scoreless separation method is that the sheared glass sheet 705' has considerably stronger edges when compared to conventional scored glass sheets and as such can be rolled into a relatively small diameter on the take-up roller 745. Plus, LCD and other brittle materials in various configurations, i.e. portrait, landscape, rolled, catinary, can be separated using this scoreless separation technology.

A person skilled in the art should readily appreciate that any type of glass manufacturing system that draws molten glass to make a glass sheet can also incorporate and use the scoreless separation apparatus 702 of the present invention. In fact, the scoreless separation apparatus 702 could be used to score other types of materials in addition to a glass sheet such as for example a plexi-glass sheet, LCD substrate etc. . . . . Accordingly, the scoreless separation apparatus 702 of the present invention should not be construed in a limited manner.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A device for separating an un-scored, flexible, thin glass sheet having a first surface, an opposing second surface and a thickness of less than 100 μm, said device comprising:
a support plate for supporting a first surface of an un-scored, flexible, thin glass sheet;
a first stabilizing surface extending from the support plate for contacting the first surface of the glass sheet;
an anvil surface extending from the support plate and spaced from the first stabilizing surface for contacting the first surface of the glass sheet;
a second stabilizing surface mounted for movement into contact with a second surface of the glass sheet and pressing the glass sheet against the support plate, when pressed against the glass sheet the second stabilizing surface is spaced from the anvil surface on a side of the anvil surface opposite the first stabilizing surface;
a stress surface mounted for movement toward the support plate into contact with the second surface of the glass sheet adjacent to and spaced from the anvil surface, and between the first stabilizing surface and the anvil surface, whereby, as the stress surface is moved toward the support plate, the stress surface contacts the second surface of the glass sheet and presses the glass sheet between the anvil surface and the first stabilizing surface causing the glass sheet to bend (i) away from the support plate from the second stabilizing surface to the anvil surface, (ii) toward a surface of the support plate from the anvil surface to the stress surface, and (iii) away from the surface of the support plate from the stress surface to the first stabilizing surface, thereby generating a combined bending stress and shear stress profile within the glass sheet adjacent to the anvil surface that produces a crack in the un-scored, thin glass sheet and separates the glass sheet into two separate glass sheets.

2. The device of claim 1, wherein the anvil surface extends further from the support plate than the first stabilizing surface.

3. The device of claim 1, further comprising at least one micrometer used to position the glass sheet at a desired position on the support plate.

4. The device of claim 1, further comprising an initiator used to score an edge of the glass sheet where the crack is to be formed in the glass sheet.

5. The device of claim 1, further comprising a cutter which cuts or partially cuts a coating on the glass sheet prior to separating the glass sheet.

6. The device of claim 1, wherein the stress surface is arranged to be moved parallel to the anvil surface and parallel to the glass sheet.

7. The device of claim 1, wherein the stress surface is arranged to be moved downward at an angle to the anvil surface and the glass sheet, such that the stress surface initially contacts the glass sheet at one edge of the sheet only, and such that the separation in the glass sheet starts at the one edge and propagates across the glass sheet.

8. A device for separating a glass sheet having a first surface and an opposing second surface, said device comprising:
a support plate for supporting the first surface of the glass sheet;
a first stabilizing surface extending from the support plate for contacting the first surface of the glass sheet;
an anvil surface extending from the support plate and spaced from the first stabilizing surface for contacting the first surface of the glass sheet;
a second stabilizing surface mounted for movement into contact with the second surface of the glass sheet and pressing the glass sheet against the support plate, when pressed against the glass sheet the second stabilizing surface is spaced from the anvil surface on a side of the anvil surface opposite the first stabilizing surface;
a stress surface mounted for movement toward the support plate into contact with the second surface of the glass sheet adjacent to and spaced from the anvil surface, and between the first stabilizing surface and the anvil surface, whereby, as the stress surface is moved toward the support plate, the stress surface contacts the second surface of the glass sheet and presses the glass sheet between the anvil surface and the first stabilizing surface causing the glass sheet to bend (i) away from the support plate from the second stabilizing surface to the anvil surface, (ii) toward the support plate from the anvil surface to the stress surface, and (iii) away from the support plate from the stress surface to the first stabilizing surface, thereby generating a combined bending stress and shear stress profile within the glass sheet adjacent to the anvil surface that produces a crack in the glass sheet and separates the glass sheet into two separate glass sheets; and
wherein the anvil surface extends further out from the support plate toward the glass sheet when compared to the first stabilizing surface which also extends out from the support plate toward the glass sheet.

9. The device of claim 8, further comprising at least one micrometer used to position the glass sheet at a desired position on the support plate.

10. The device of claim 8, further comprising an initiator used to score an edge of the glass sheet where the crack is to be formed in the glass sheet.

11. The device of claim 8, further comprising a cutter which cuts or partially cuts a coating on the glass sheet prior to separating the glass sheet.

12. The device of claim 8, wherein the first stabilizing surface is positioned with respect to the anvil surface and the stress surface to ensure that there is always a stress continuously applied to the glass sheet to maintain a stress field in the glass sheet and cause a propagation in the crack to proceed in a desired direction along a predefined path on the glass sheet until the glass sheet separates into the two separate glass sheets.

13. A device for separating a glass sheet, said device comprising:
- a support plate;
- a first stabilizing surface extending out from the support plate;
- an anvil surface extending out from the support plate, where the glass sheet is located on top of the support plate, the first stabilizing surface, and the anvil surface;
- a second stabilizing surface placed on top of the glass sheet, where the second stabilizing surface is located on an opposite side of the glass sheet when compared to the first stabilizing surface and the anvil surface, where the second stabilizing surface is located closer to the anvil surface than to the first stabilizing surface;
- a stress surface placed on the top of the glass sheet, where the stress surface is located between the first stabilizing surface and the anvil surface both of which are located on the opposite side of the glass sheet from the stress surface, where the stress surface is located closer to the anvil surface than to the first stabilizing surface, and where the stress surface when moved towards the glass sheet contacts the glass sheet to generate a stress profile within the glass sheet that produces a crack in the glass sheet and separates the glass sheet into two separate glass sheets; and wherein the anvil surface extends further out from the support plate toward the glass sheet when compared to the first stabilizing surface which also extends out from the support plate toward the glass sheet.

14. The device of claim 13, further comprising at least one micrometer used to position the glass sheet at a desired position on the support plate.

15. The device of claim 13, further comprising an initiator used to score an edge of the glass sheet where the crack is to be formed in the glass sheet.

16. The device of claim 13, further comprising a cutter which cuts or partially cuts a coating on the glass sheet prior to separating the glass sheet.

17. The device of claim 13, wherein the first stabilizing surface is positioned with respect to the anvil surface and the stress surface to ensure that there is always a stress continuously applied to the glass sheet to maintain a stress field in the glass sheet and cause a propagation in the crack to proceed in a desired direction along a predefined path on the glass sheet until the glass sheet separates into the two separate glass sheets.

\* \* \* \* \*